G. NOLIN.
CURRY-COMB.
No. 178,874.                                        Patented June 20, 1876.
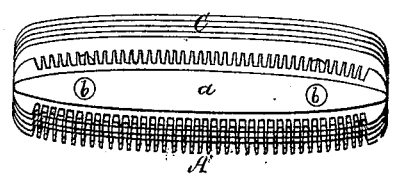
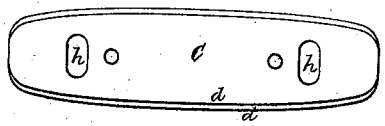
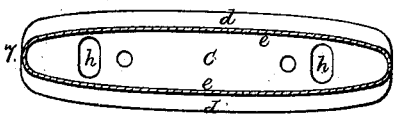
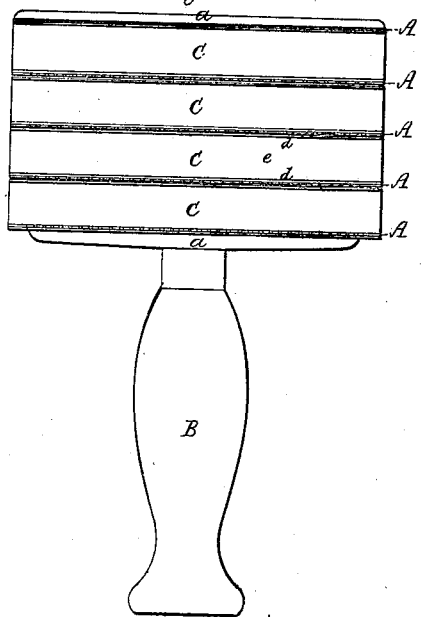
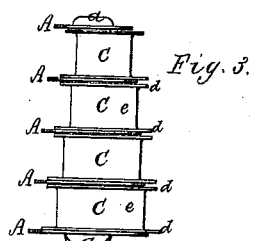
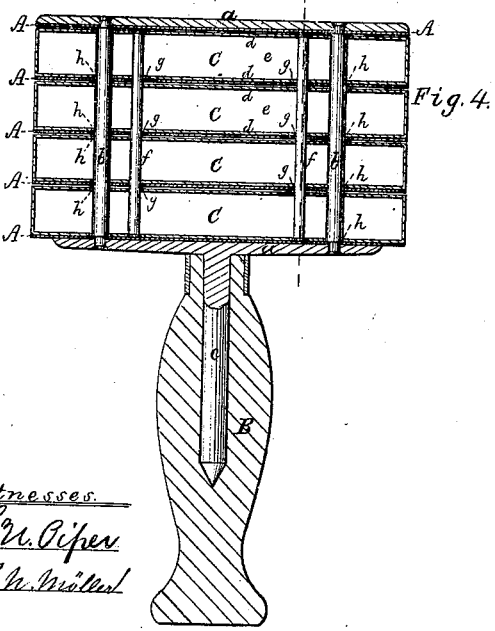
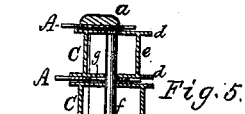
Witnesses.
S. N. Piper
L. N. Niles
Gervais Nolin.
by his attorney
R. H. Eddy

UNITED STATES PATENT OFFICE.

GERVAIS NOLIN, OF WEST WATERVILLE, MAINE.

IMPROVEMENT IN CURRY-COMBS.

Specification forming part of Letters Patent No. 178,874, dated June 20, 1876; application filed May 13, 1876.

*To all whom it may concern:*

Be it known that I, GERVAIS NOLIN, of West Waterville, of the county of Kennebec and State of Maine, have invented a new and useful Improvement in Curry-Combs; and do hereby declare the same to be fully described in the following specification and represented in the accompanying drawings, of which—

Figure 1 is a top view, Fig. 2 a front elevation, Fig. 3 an end elevation, Fig. 4 a longitudinal section, and Fig. 5 a transverse section, of a curry-comb embracing my invention.

In carrying out my improvement I provide the series of the dentated plates of the implement with a series of clearers, all being substantially and to operate as hereinafter described.

In the drawings, A A A are a series of dentated plates, each being provided with teeth arranged on its opposite longer edges. These plates are disposed parallel to each other, at equal distances apart, and between two parallel bars, $a\ a$, connected by rods $b\ b$, which extend from one of such bars to the other, and through the dentated plates, these latter being securely fastened to the said rods. From the middle of the lower bar $a$ a shank, $c$, is extended at right angles, and into a handle, B. Between the dentated plates A there is arranged, in manner as shown, a series of movable clearers, C C C, each being composed of two plates, $d\ d$, connected by an elongated tube, $e$, Fig. 6 being a top view, and Fig. 7 a horizontal section, of one of said clearers.

I prefer to connect all the clearers together by rods $f\ f$, going from one to the other, and through slots $g\ g$, made laterally in the intermediate dentated plates.

Where the rods $b\ b$ go through the clearers, they (the said clearers) are provided with lateral slots $h\ h$, the whole being to enable the clearers to move laterally either way between the dentated plates, in order to clear their teeth of any accumulations of hair, dandruff, or matter removed from the hide or skin of an animal during the process of currying the same.

With my improved curry-comb a groom or hostler, after having used it, will have no need of striking or beating it against a hard surface to clear it of the hair or dandruff, which he can do by giving the comb a slight and quick shake laterally, so as to cause the clearers to move quickly between the toothed plates.

I claim as my invention or improvement in the curry-comb—

1. The combination of the series of movable clearers C with the series of dentated plates A and the handle B, arranged and connected substantially as specified, the said series of clearers being disposed between the dentated plates, and to operate therewith essentially as explained.

2. Each clearer C, as composed of the two elongated and slotted plates $d\ d$ and the connection-tube $e$, arranged as represented.

3. The combination of the series of clearers C and their connection-rods $f\ f$, arranged as set forth.

GERVAIS NOLIN.

Witnesses:
LOUIS BELANGER,
A. A. NICKERSON.